United States Patent [19]

Zanini-Fisher

[11] Patent Number: 4,771,271
[45] Date of Patent: Sep. 13, 1988

[54] SILICON BASED LOW LEVEL LIQUID SENSOR HAVING A FAST RESPONSE TIME

[75] Inventor: Margherita Zanini-Fisher, Birmingham, Mich.

[73] Assignee: Ford Motor Company, Dearborn, Mich.

[21] Appl. No.: 24,750

[22] Filed: Mar. 11, 1987

[51] Int. Cl.[4] ............................................. G08B 21/00
[52] U.S. Cl. ................................. 340/620; 340/620; 340/622; 324/65 R; 73/295; 73/304 R; 338/22 SD
[58] Field of Search ............... 73/290 R, 291, 292, 73/295, 304 R, 202, 204; 340/617, 618, 620, 622; 338/25, 27, 28, 22 R, 22 SD, 23, 24, 222; 324/71.5, 65 R

[56] References Cited

U.S. PATENT DOCUMENTS

| | | | |
|---|---|---|---|
| 3,735,638 | 5/1973 | Miller | 73/304 R |
| 3,890,478 | 6/1975 | Riddel | 73/308 |
| 4,036,053 | 7/1977 | Jenkins | 73/295 |
| 4,053,874 | 10/1977 | Glaser | 73/295 |
| 4,129,848 | 12/1978 | Frank et al. | 73/295 |
| 4,163,391 | 8/1979 | Bezard et al. | 73/295 |
| 4,277,773 | 7/1981 | Blatnik | 340/620 |
| 4,283,719 | 8/1981 | Williams et al. | 73/304 R |
| 4,457,169 | 7/1984 | Lauterbach et al. | 73/202 |
| 4,506,258 | 3/1985 | Charboneau et al. | 340/618 |
| 4,525,850 | 6/1985 | Miller | 73/304 R |
| 4,548,077 | 10/1985 | van Patten | 73/204 |
| 4,594,889 | 6/1986 | McCarthy | 73/204 |
| 4,609,913 | 9/1986 | Arbogast | 340/622 |
| 4,627,279 | 12/1986 | Ohta | 73/204 |
| 4,679,432 | 7/1987 | Draeger | 338/24 |

FOREIGN PATENT DOCUMENTS 0019135 11/1980 European Pat. Off. .
2138566 10/1984 United Kingdom .

OTHER PUBLICATIONS

SAE 800127; Solid-State Automotive Liquid Level Sensing System; Tarpley et al.
IEEE Publication; 1985; Design and Packaging of a Highly Sensitive Microtransducer for Air Flow and Differential Pressure Sensing Applications; Johnson et al.

Primary Examiner—Joseph A. Orsino, Jr.
Assistant Examiner—Jill D. Jackson
Attorney, Agent, or Firm—Allan J. Lippa; Peter Abolins

[57] ABSTRACT

A low liquid level sensor fabricated on a silicon substrate having four temperature dependent elements formed thereon in a Wheatstone Bridge configuration. A thin, wire-like extension of the substrate between two openings within the substrate provides a mounting member for the fourth element. The other three elements are spacially separated from the fourth element such that the fourth element becomes exposed to air during a low liquid level condition while the other three elements remain submerged within the liquid. Accordingly, the Wheatstone bridge configuration and relative positioning of the elements on the substrate eliminates the need for corrections due to temperature variations and power supply fluctuations.

8 Claims, 4 Drawing Sheets

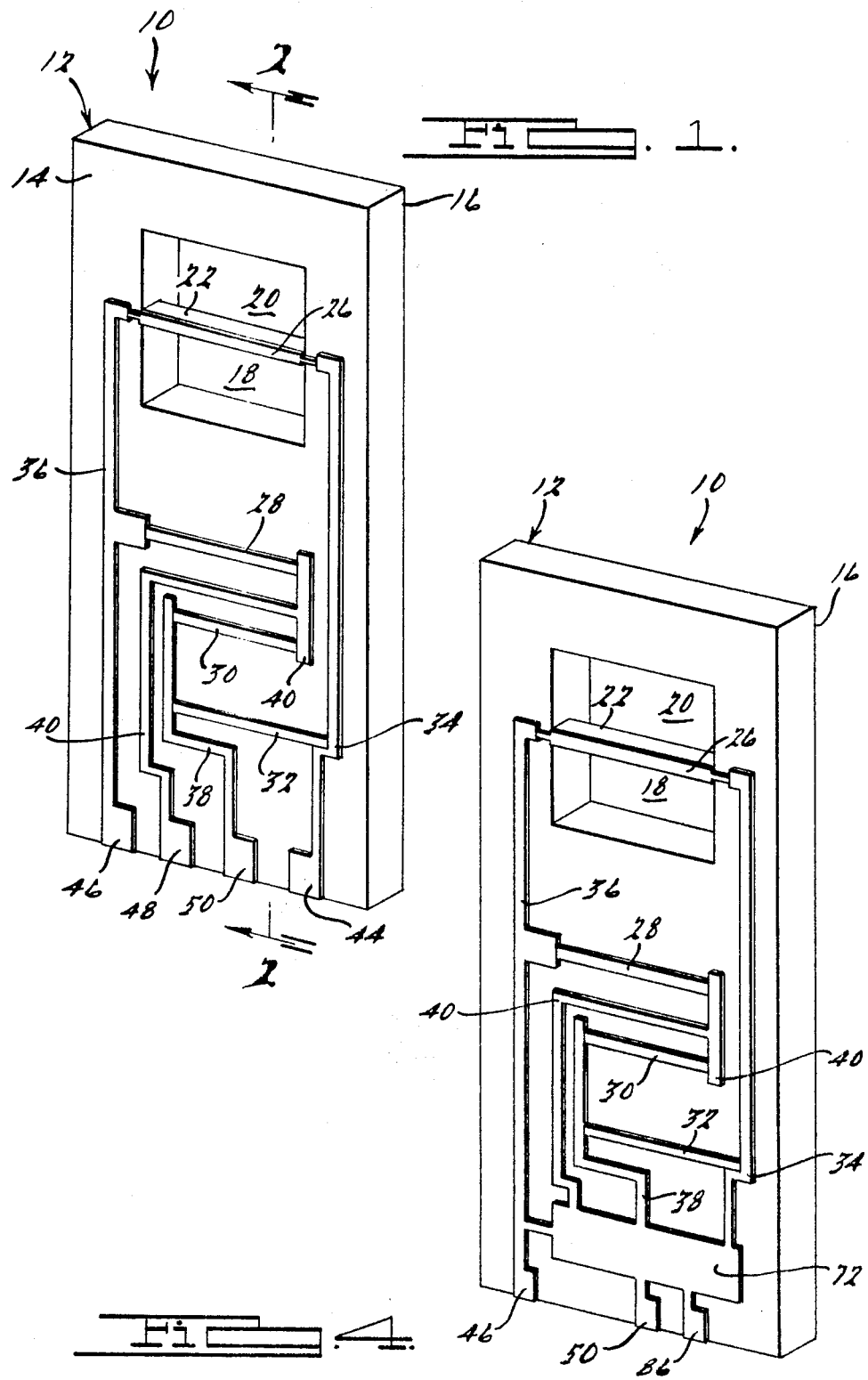

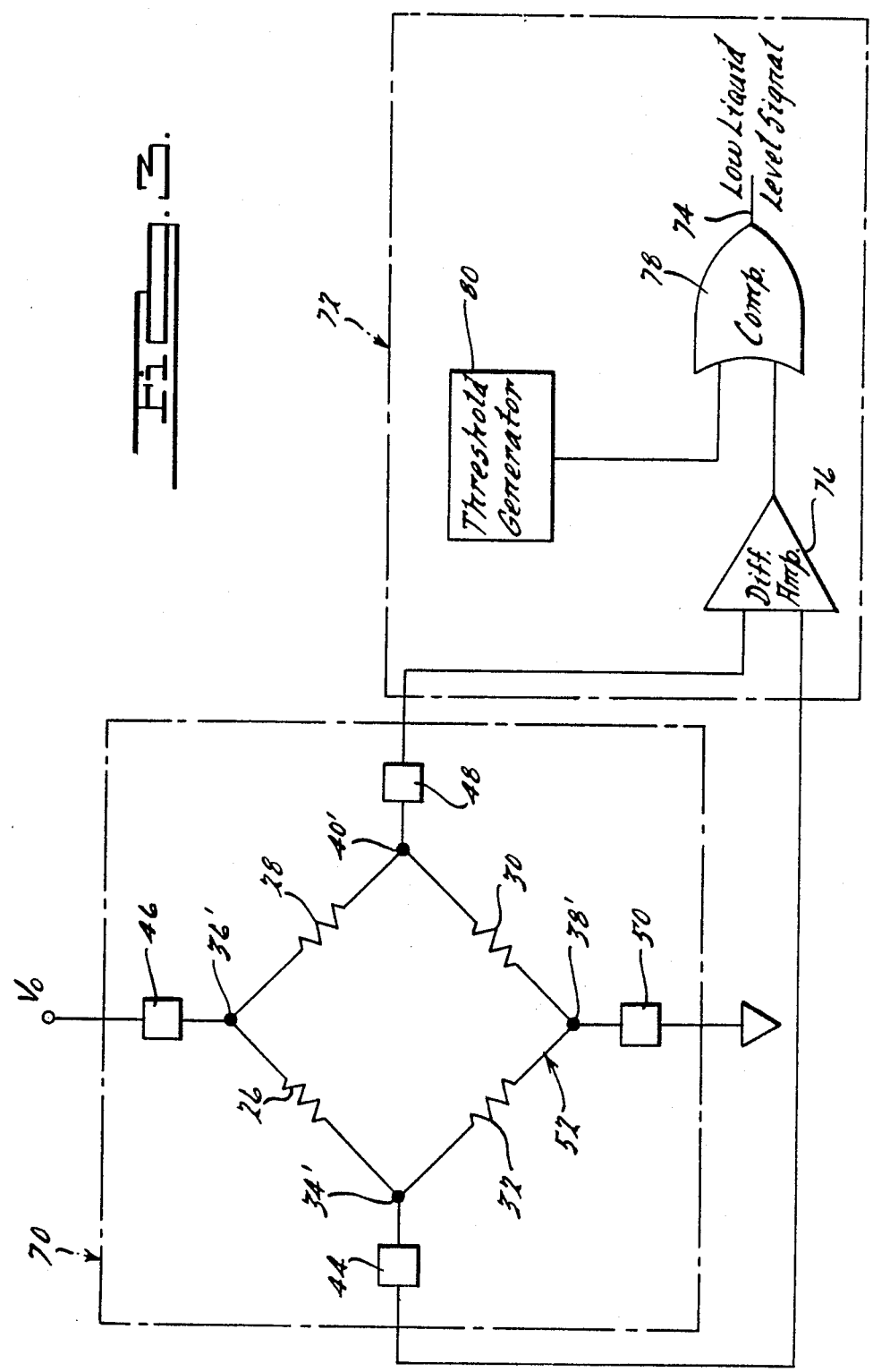

SILICON BASED LOW LEVEL LIQUID SENSOR HAVING A FAST RESPONSE TIME

BACKGROUND OF THE INVENTION

The invention relates to an apparatus for providing an electrical indication of low liquid level. Although the invention is particularly suited for liquid reservoirs in automobiles, such as those for hydraulic fluids, lubricating fluids, washer fluids, and cooling fluids, the invention may be used for detecting low liquid levels in any liquid receptacle.

Known low level indicators include a temperature dependent resistive element, such as a thin wire, which is adapted for submersion within a liquid reservoir. The element is electrically heated by either passing a current therethrough or thermally coupling the element to a heating device. Variations in the electrical resistance of the heated element are then detected employing external circuitry. Since thermal transfer to a liquid is greater than thermal transfer to air, an increase in measured resistance provides an indication that the liquid level has receded sufficiently to expose at least a portion of the element to air.

A problem with these approaches is that corrections are required for variations in the ambient temperature of the reservoir and variations in the power supply. Variations in ambient temperature may be particularly severe in an automobile wherein a liquid reservoir may range in temperature from −20° F. to over 200° F. Prior approaches to solving this problem include: the use of sample and hold circuitry (U.S. Pat. No. 4,525,850); differentiating circuitry (U.S. Pat. No. 4,283,719); updating reference circuitry (SAE 800127, entitled "Solid-State Automotive Liquid Level Sensing System", by R. W. Tarpley et al); and, ambient temperature measurements by a separate temperature dependent element and associated compensating circuitry (U.S. Pat. No. 4,457,169). All of these approaches require the use of complicated external circuitry coupled to the sensor.

It is also known to use silicon substrates, and associated fabricating techniques, to provide a liquid level sensing apparatus having greater durability and lower cost than thin wire sensors. However, the response time of the thin wire sensors has been difficult to duplicate. Further, as in the case of hot wire sensors, these approaches also require external circuitry and associated interconnection to compensate for changes in ambient temperature and fluctuations in the power supply.

The following are examples of different sensors which are produced on silicon substrates. U.S. Pat. No. 4,129,848, discloses a silicon substrate with a layer of silicon dioxide and a temperature dependent film of nickel or platinum deposited thereon. In one embodiment, a portion of the silicon substrate is etched away, exposing the layers of silicon dioxide and temperature dependent film. U.S. Pat. No. 4,594,889 discloses a mass airflow sensor having an elongated silicon member positioned between openings through the silicon substrate and a metal deposited on the member. UK patent application No. 2,138,566A discloses a mass flow sensor having multiple resistive elements deposited on a silicon substrate between gaps in the silicon substrate. EPO Pat. No. 0019135 discloses a mass flow sensor having multiple resistive elements deposited on a silicon substrate in a bridge configuration. Another device is discussed in IEEE publication CH2127-9/85/0000-0358, by R. G. Johnson et al, entitled "Design and Packaging of a Highly Sensitive Microtransducer For Air Flow and Differential Pressure Sensing Applications." The publication shows a gas flow sensor fabricated from a silicon chip having a temperature sensitive resistor mounted on a dielectric film suspended over an etch pit in the chip.

There still remains a need for a low liquid level sensor having a fast response time which is economically manufactured by conventional microelectronic batch processing techniques known in the microelectronics industry. In addition, a need remains for a sensor which is produced on a single chip and does not require corrections for changes in ambient temperature conditions and power fluctuations. Further, it would be advantageous to provide a single sensor suitable for use with a variety of different liquids, each having a different degree of corrosivity, thermal transfer, and/or electrical conductivity. These are some of the problems the invention overcomes.

SUMMARY OF THE INVENTION

This invention includes the combination of a silicon substrate having a first and a second opening adjacent to one another and extending through the substrate; an elongated silicon member defined by the portion of the substrate positioned between the first and second openings, the silicon member having a thickness substantially less than the thickness of the substrate; first, second and third temperature dependent elements, each comprising a resistive film attached to the top planar surface of the silicon substrate; a fourth temperature dependent element comprising a resistive film attached to the elongated silicon member, the fourth element being spacially separated from each of the other elements such that the fourth element would initially be exposed to air during a low liquid condition in the reservoir; at least one layer of silicon nitride coating the entire outer surface of the silicon substrate and the resistive elements; and means mounted on the planar surface for electrically connecting each of the resistive elements together in a Wheatstone Bridge configuration.

Such a device may be fabricated by conventional low-cost batch processing techniques known in the microelectronics industry. Further, the minimal thermal mass of the elongated silicon member does not impair the fast response time of the resistive film deposited thereon. Thus, the invention provides a combination of durability and speed heretofore unobtainable. In addition, as described in greater detail hereinafter, the unique structure of this particular Wheatstone Bridge, wherein one resistive arm is spacially separated from the other three arms on the same substrate, provides corrections for changes in ambient conditions and/or voltage variations. Further still, the silicon nitride coating prevents electrical conduction through the silicon substrate and protects the apparatus from corrosive attack. Accordingly, the same apparatus may be used to advantage with a wide variety of fluids.

BRIEF DESCRIPTION OF THE DRAWINGS

FIG. 1 is a perspective view of the low liquid level sensor in accordance with an embodiment of this invention;

FIG. 3 is an electrical schematic of an embodiment of this invention; and

FIG. 4 is a perspective view of an alternate embodiment of a low liquid level sensor fabricated in combination with an indicator circuit on the same silicon substrate.

DESCRIPTION OF THE PREFERRED EMBODIMENT

Figure 2A:
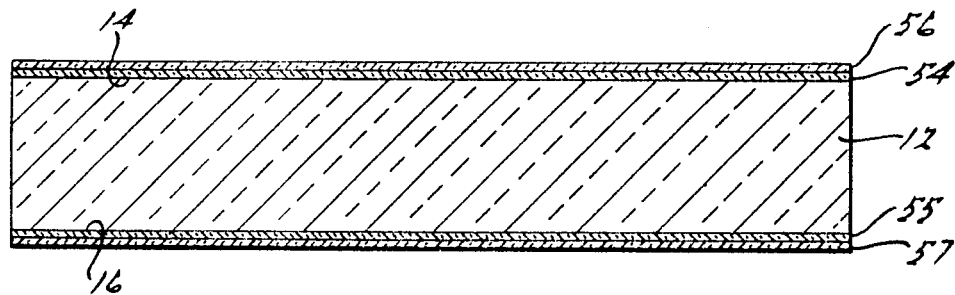
FIGS. 2A through 2G are cross-sectional views taken along line 2—2 of FIG. 1 illustrating sequential fabrication of a sensor in accordance with an embodiment of this invention.

Referring to FIG. 1, a low liquid level sensor 10 is shown, including a silicon substrate 12 with top planar surface 14, bottom planar surface 16 (FIG. 2), first opening 18, and an adjacent second opening 20. Elongated member 22 is shown defined by the spacing between first opening 18 and second opening 20. Member 22 has a wire-like thickness of between 50-80 microns formed by etching notch 24 (FIG. 2G) into the bottom planar surface 16 of substrate 12 as described in greater detail hereinafter.

Temperature dependent element or film resistor 26 is here shown attached to the top surface of member 22. Shown attached to top planar surface 14 are film resistor 28, film resistor 30, and film resistor 32 which are spacially separated from film resistor 26. The film resistors may be comprised of any material having the desired temperature coefficient of resistivity to achieve the desired response time for the particular application in which sensor 10 is used to advantage. In an application particularly suited to automobile liquid reservoirs, nickel and platinum were found to be advantageous materials for the film resistors.

Continuing with FIG. 1, and also referring to the electrical schematic of FIG. 3, the four film resistors are electrically connected together in a Wheatstone Bridge configuration by strips of metal or electrically conductive film, such as aluminum. More specifically, conductive film 34 forms a node 34' (FIG. 3) of Wheatstone Bridge 52 electrically interconnecting film resistor 26, film resistor 32, and conductive terminal 44. Similarly, conductive film 36 forms a node 36' (FIG. 3) electrically interconnecting film resistor 26, film resistor 28, and conductive terminal 46; conductive film 38 forms a node 38' (FIG. 3) electrically interconnecting film resistor 30, film resistor 32, and conductive terminal 50; and conductive film 40 forms a node 40' (FIG. 3) electrically interconnecting film resistor 28, film resistor 30, and conductive terminal 48.

Referring to FIGS. 2A through 2G, the fabrication of low liquid level sensor 10 is described wherein conventional techniques well known in the microelectronics industry are utilized. Although the fabrication is described with reference to a single sensor 10, the fabrication is particularly suited to batch processing numerous identical sensors on a single wafer or substrate.

Layer of silicon oxide 54 and layer of silicon oxide 55, preferably having a thickness from 500-1500 angstroms, are first grown on top planar surface 14 and bottom planar surface 16, respectively, by heating substrate 12 in an oxygen containing atmosphere (FIG. 2A). First layer of silicon nitride 56 and first layer of silicon nitride 57 are then deposited over silicon oxide layer 54 and silicon oxide layer 55, respectively, by conventional chemical vapor deposition techniques (FIG. 2A). Silicon nitride layer 56 and silicon nitride layer 57, preferably having a thickness from 500-1500 angstroms, protect substrate 12 from corrosive attack by caustic liquids. Further, the silicon nitride layers protect components of sensor 10 from the etching steps described hereinbelow.

Figure 2B:
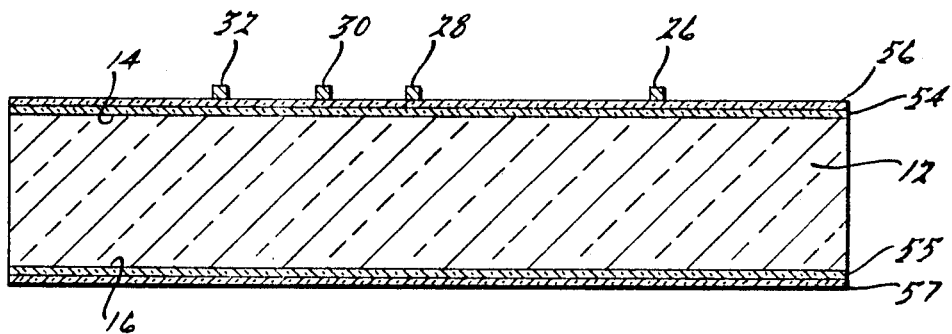

A film of nickel, or other suitable resistive film, is then deposited over silicon nitride layer 56 and delineated, utilizing conventional photolithographic techniques, to form film resistor 26, film resistor 28, film resistor 30, and film resistor 32 (FIG. 2B). Similarly, a film of metal, such as aluminum, is deposited and delineated utilizing conventional photolithic techniques to form conductive film 34, conductive film 36, conductive film 38, conductive film 40, conductive terminal 44, conductive terminal 46, conductive terminal 48, and conductive terminal 50 (FIG. 1).

Figure 2C:
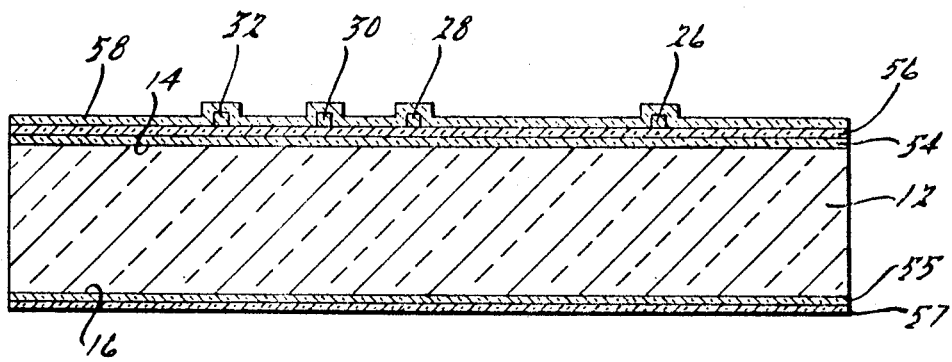
Figure 2D:
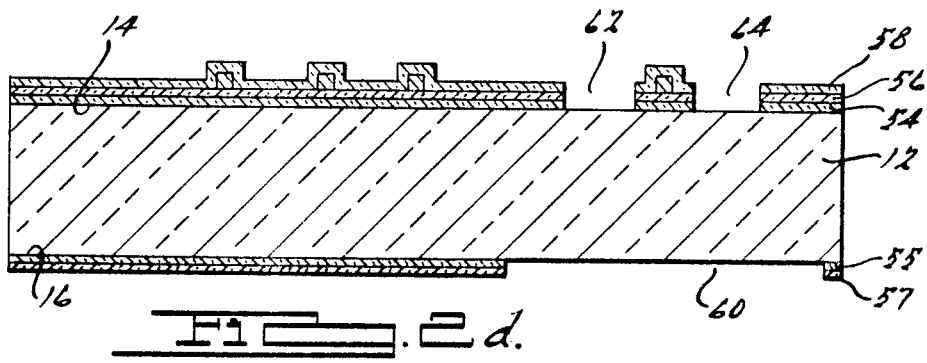

Second layer of silicon nitride 58, preferably having a thickness of from 1000-1500 angstroms, is then deposited over conductive films 36, 38, 40, conductive terminals 44, 46, 48, 50, and exposed portions of layer 56 by chemical vapor deposition (FIG. 2C). Portions of the silicon nitride layers 56, 57 and 58, and silicon oxide layers 54 and 55, are subsequently dry etched with carbon flouride (FIG. 2D). The dry etching exposes an area 60 of bottom planar surface 16 having approximately equal dimensions to notch 24 which will be formed by processes described hereinbelow. Similarly, the dry etching exposes area 62 and area 64 of top planar surface 14 having approximately equal dimensions to first opening 18 and second opening 20, respectively, which will also be formed by the process steps described hereinbelow.

Figure 2E:
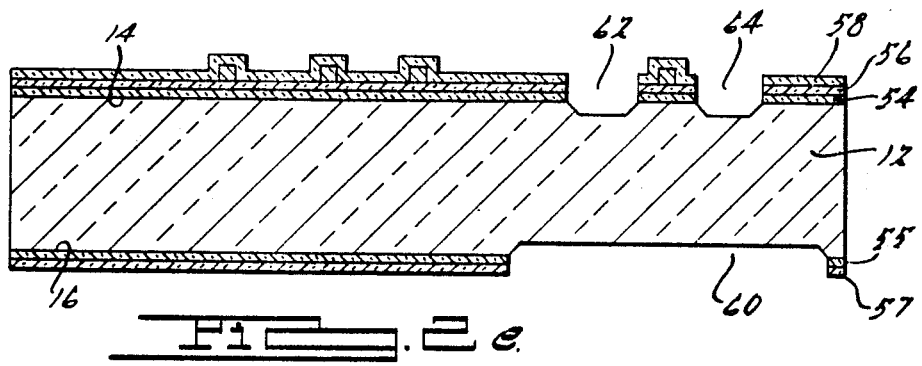
Figure 2F:
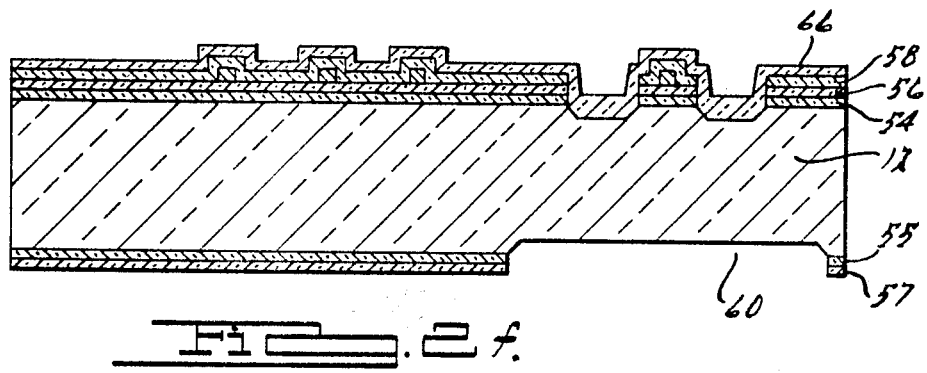

Surface areas 60, 62 and 64 are then chemically etched by an anistropic etchant solution, such as aqueous potassium hydroxide solution or ethylene diumine-pyrocatechol solutions (FIG. 2E). The etching of area 62 and area 64 is timed to define a thickness of slicon member 22 of between 50-80 microns. It has been found that this thickness does not noticeably impair the thermal response of film resistor 26 while enabling sufficient physical support to film resistor 26 under the adverse conditions likely to be found in many liquid reservoirs wherein sensor 10 may be used to advantage.

Figure 2G:
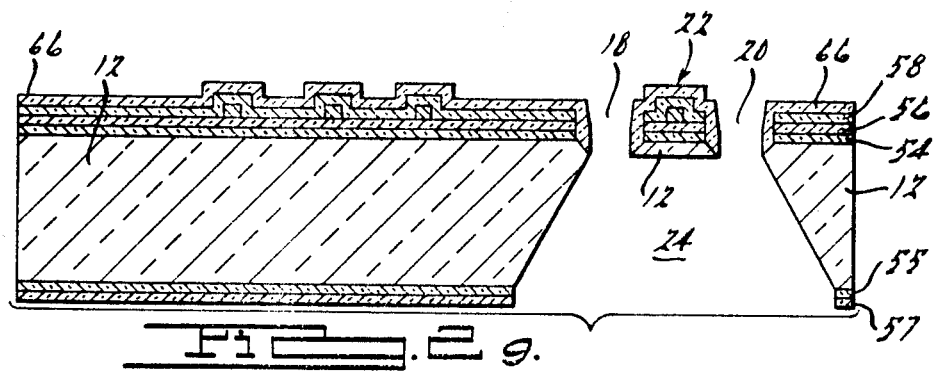

A third layer of silicon nitride 66, preferably having a thickness from 2000-4000 angstroms, is subsequently deposited over layer 58 by chemical vapor deposition (FIG. 2F) to provide the advantages described hereinabove. A final chemical etching technique utilizing the chemical solutions described hereinabove is then employed for etching through substrate 12 to define first opening 18 and second opening 20 (FIG. 2G).

Referring now to FIG. 3, the equivalent electrical schematic 70 of sensor 10 is shown electrically coupled to an external trigger circuit 72 which provides a signal on line 74 indicative of a low liquid level. Trigger circuit 72 is an example of one of many electrical circuits which may be used to advantage in combination with sensor 10. In applications where the voltage output of bridge 52 is sufficiently large, trigger circuit 72 may not be required.

Referring first to electrical schematic 70, nodes 36' and 38' comprise the input diagonal of bridge 52 for receiving power from an external power source, preferably a DC voltage $V_0$, through respective conductive terminals 46 and 50. Nodes 34' and 40', which are connected to respective conductive terminals 44 and 48, comprise the output diagonal of bridge 52. The resistance value of film resistors 26, 28, 30 and 32 are chosen such that bridge 52 operates in a balanced condition wherein the voltage across the output diagonal between nodes 34' and 40' is either zero or a predetermined value. For the embodiment shown, all the film resistors have been selected to have the same resistance value whereby the balanced bridge condition is zero volts across the output diagonal. Those skilled in the art recognize, however, that various other resistance values may be selected having a proper ratio to one another such that bridge 52 operates in a balanced condition.

With reference to trigger circuit 72, the input of a differential amplifier 76 is shown connected to the output diagonal of bridge 52. The output of differential amplifier 76 and a threshold generator 80 are shown coupled to the inputs of a comparator 78. Threshold generator 80, having values stored therein which are a function of the physical properties of the liquid in which sensor 10 is immersed, may comprise a memory, adjustable potentiometer or the like. When the output of differential amplifier 76 is greater than the threshold value, comparator 78 provides a low liquid level signal on line 74 for activating a visual indicator (not shown). The low liquid level signal may also be utilized as an input for various monitoring and/or control systems.

In operation, sensor 10 is positioned within a liquid containing reservoir such as those used for hydraulic fluids, engine lubricating oil, engine cooling liquid, or washer liquid. Sensor 10 is positioned such that film resistor 26 (FIG. 1) will be exposed to air under a low liquid condition before film resistors 28, 30 and 32. When all the resistors are submerged within a liquid, the heat generated by the electric current passing through each of the film resistors will be conducted from the film resistors to the liquid at substantially the same rate. Thus, each of the film resistors will operate at the same temperature and therefore have the same electrical resistance. Stated another way, each of the film resistors will vary from their nominal resistance values by the same amount. Accordingly, bridge 52 will continue to operate in the balanced condition without a voltage drop between nodes 34' and 40'. A low liquid level signal will therefore not be provided from comparator 78.

Bridge 52 will operate substantially under balanced conditions during normal liquid levels regardless of changes in ambient conditions or changes in the power source $V_0$. For example, regardless of whether the liquid is at $-20°$ F., during a cold soak, or in excess of $200°$ F., during engine operation, each of the film resistors will vary from their nominal values by the same amount resulting in a balanced bridge 52. Further, although the current passing through each of the film resistors will vary with fluctuations in the power source $V_0$, the resulting variations in resistance value will be the same for each of the film resistors. Accordingly, bridge 52 will remain in the balanced mode. Thus, sensor 10 does not require additional circuitry and/or an additional sensor to compensate for changes in ambient conditions or fluctuations in power source.

During a low liquid level condition, at least a portion of film resistor 26 will be exposed to air while film resistors 28, 30 and 32 remain immersed in liquid. Since the rate of heat transfer to air is lower than to a liquid, film resistor 26 will operate at a higher temperature and therefore have a greater electrical resistance than the other film resistors. Accordingly, bridge 52 will operate in an unbalanced mode with a voltage across the output diagonal between nodes 34' and 40'. This voltage difference is amplified and compared to the threshold value for providing the appropriate low liquid level signal on line 74 of trigger circuit 72.

Another embodiment of sensor 10 is shown in FIG. 4, wherein like numerals refer to like parts of the embodiment illustrated in FIGS. 1 and 3. For the embodiment shown in FIG. 4, trigger circuit 72 has been fabricated on substrate 12 by performing conventional microelectronics processing. The low liquid level signal from trigger circuit 72 is now shown coupled to conductive terminal 86. Since conductive terminals 44 and 48 are no longer required for connecting the output diagonal of bridge 52 to external circuitry, a further savings in interconnection with the liquid reservoir is gained by this embodiment.

Various modifications and variations will no doubt occur to those skilled in the various arts to which this invention pertains. For example, the relative shape and size of the openings in the substrate may be varied from that disclosed herein, and the components and functional operation of trigger circuit 72 may also be widely varied. These and all other variations which basically rely on the teachings to which this disclosure has advanced the art are properly considered within the scope of this invention.

I claim:

1. An apparatus adapted to be inserted within a liquid reservoir for providing an indication of low liquid levels, comprising:
   a silicon substrate having a top planar surface, a bottom planar surface, a first opening extending through both of said planar surfaces, and a second opening adjacent to said first opening and also extending through both of said planar surfaces;
   an elongated silicon member defined by the portion of said silicon substrate positioned between said first opening and said second opening, said silicon member having a thickness substantially less than the thickness of said silicon substrate;
   a first temperature dependent element, a second temperature dependent element and a third temperature dependent element, each comprising a resistive film attached to said top planar surface of said silicon substrate;
   a fourth temperature dependent element comprising a resistive film attached to the top surface of said silicon member, said fourth element being spatially separated from each of the other of said elements by said first opening such that said fourth element would be exposed to air during a low liquid condition in the reservoir while each of the other of said elements would remain submerged in the liquid;
   connecting means mounted on said top planar surface of said silicon substrate for electrically connecting each of said elements together in a Wheatstone Bridge configuration;
   heating means coupled to said Wheatstone Bridge for heating each of said elements by passing an electrical current through each of said elements; and
   detecting means coupled to said Wheatstone Bridge for detecting a change in electrical resistance of said first element to provide the low liquid level indication.

2. The apparatus defined in claim 1 wherein said detecting means comprises:
   a differential amplifier attached to said top planar surface of said silicon substrate and electrically connected to said Wheatstone Bridge; and means attached to said top planar surface of said silicon substrate for comparing the output of said differential amplifier with a reference value.

3. The apparatus defined in claim 1, further comprising:
a layer of silicon oxide deposited on said top planar surface;
a layer of silicon nitride deposited over said layer of silicon oxide; and
wherein each of said temperature dependent elements is deposited over said layer of silicon nitride.

4. The apparatus defined in claim 3, further comprising another layer of silicon nitride deposited over each of said temperature dependent elements.

5. The apparatus defined in claim 1, wherein said connecting means comprises strips of a conductive material mounted on said top planar surface.

6. The apparatus defined in claim 1, wherein said first opening, said second opening and said silicon member are formed by a process including the steps of:

etching a portion of said top planar surface to a predetermined depth to form a first indentation and a second indentation respectively positioned where said first opening and said second opening are to be positioned; and etching a portion of said bottom planar surface sufficiently to etch away the bottom surfaces of said first indentation and said second indentation to respectively define said first opening and said second opening, said etching also defining said silicon member being positioned between said first opening and said second opening wherein said silicon member has a thickness substantially equal to said predetermined depth of said first indentation and said second indentation.

7. The apparatus defined in claim 1, wherein each of said temperature dependent elements is comprised of nickel.

8. The apparatus defined in claim 1 wherein said elongated silicon member has a thickness of between 50 and 80 microns.

* * * * *